United States Patent [19]

Tsutsumi et al.

[11] Patent Number: 5,283,133
[45] Date of Patent: Feb. 1, 1994

[54] MAGNETO-OPTICAL DISK

[75] Inventors: Kazuhiko Tsutsumi; Motohisa Taguchi; Hiroshi Sugahara, all of Amagasaki, Japan

[73] Assignee: Mitsubishi Denki Kabushiki Kaisha, Tokyo, Japan

[21] Appl. No.: 905,237

[22] Filed: Jun. 29, 1992

Related U.S. Application Data

[63] Continuation of Ser. No. 734,115, Jul. 25, 1991, abandoned, which is a continuation of Ser. No. 350,691, May 9, 1989, abandoned.

[30] Foreign Application Priority Data

Jul. 27, 1988 [JP] Japan ............... 63-188806

[51] Int. Cl.$^5$ .................................................. G11B 5/66
[52] U.S. Cl. ........................ 428/694 NF; 360/131; 360/135; 369/13; 428/694 DE; 428/900; 428/336
[58] Field of Search ............ 428/694, 900, 65, 66; 360/131, 135, 59, 114; 369/13; 430/495, 945; 365/122

[56] References Cited

U.S. PATENT DOCUMENTS

| | | | |
|---|---|---|---|
| 4,579,777 | 4/1986 | Honguu et al. | 360/135 X |
| 4,610,903 | 9/1986 | Nomura et al. | 360/135 X |
| 4,675,767 | 6/1987 | Osato et al. | 360/114 X |

FOREIGN PATENT DOCUMENTS

| | | |
|---|---|---|
| 0161807 | 11/1985 | European Pat. Off. |
| 62-27458 | 6/1987 | Japan |
| 63-171453 | 7/1988 | Japan |

OTHER PUBLICATIONS

Patent Abstracts of Japan, vol. 12, No. 224(P-721), Jun. 25, 1988, & JP-A-63-018-546, Jan. 26, 1988, Niihara Toshio, et al., "Magneto-Optical Recording Medium".
Journal of Applied Physics, vol. 45, No. 8 Aug. 1974, pp. 3643–3648; K. Egashira, et al.
IEEE Transactions on Magnetics, vol. MAG-23 Sep. 1987, pp. 2620–2621; M. Asano, et al.

*Primary Examiner*—John H. Wolff
*Assistant Examiner*—David D. Davis
*Attorney, Agent, or Firm*—Oblon, Spivak, McClelland, Maier & Neustadt

[57] ABSTRACT

A magneto-optical disk comprising a substrate, a dielectric film made of aluminum germanium nitride disposed on the substrate and a magnetic film disposed on the dielectric film. The magnetic-optical disk has increased Kerr rotational angle, while having excellent corrosion resistivity and high performance with respect to the CNR ratio.

1 Claim, 1 Drawing Sheet

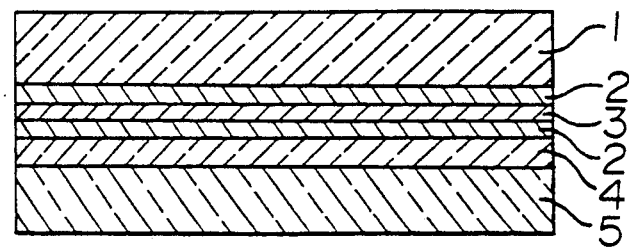

MAGNETO-OPTICAL DISK

This application is a continuation of application Ser. No. 07/734,115, filed on Jul. 25, 1991, now abandoned, which is a continuation of application Ser. No. 07/350,691, filed on May 9, 1989, now abandoned.

BACKGROUND OF THE INVENTION

1. FIELD OF THE INVENTION

The present invention concerns a magneto-optical disk for recording, reproducing and erasing information, for example, by laser beams.

2. DISCUSSION OF BACKGROUND

With the remarkable development of so-called information society in recent years, requirements for recording media of large capacity and relevant recording/reproducing system have been increased rapidly and laser video disks, digital audio-disks, write-once disks for use in image or document files have already been put to practical use. However, such recording media put to practical use at present have a drawback of incapable of rewriting, and rewritable recording media and recording/reproducing system have been demanded. Then, as one of recording/reproducing systems, magneto-optical recording/reproducing systems have been proposed and shipping for their samples has already been started.

Magneto-optical disks used in the magneto-optical recording/reproducing system basically comprise a plastic substrate or a glass substrate on which an amorphous vertical magnetization memberane (or, a thin film of amorphous magnetic material having magnetic anisotropy so that the magnetic material is magnetized with its magnetic axis perpendicular to the plane of the thin film) is formed, and rare earth-transition metal alloys such as GdTbFe, TbFeCo, DyFeCo, GdDyFe, etc. are used as the magnetic material.

The written signal in a magneto-optical disk is read out by utilizing Kerr effect, that is, the rotation of the direction of polarization on reflection. The carrier-to-noise ratio (CNR) of read signal is generally insufficient for practical use because the Kerr rotational angle is small. In view of the above, it has been attempted to increase the Kerr rotational angle by forming a dielectric film of SiO or $SiO_2$ on the magnetic material.

However, since the rare earth-transition metal alloy film is not superior in anticorrosion property, it is required that the dielectric film is effective not only for increasing the Kerr rotational angle but also for protecting the corrosion of magnetic film. The SiO or $SiO_2$ film has a drawback of incapable of providing substantial protection against corrosion. As for the improvement of the drawback, $Si_3N_4$ or AlN has been proposed as the dielectric film. As the example for the former, Japanese Patent Publication No. Sho 62-27458 discloses the use of a silicon nitride film, which increases the Kerr rotational angle and which is suitable to practical use.

When the silicon nitride film is deposited by means of sputtering, since the film having such a refractive index as that increases the Kerr rotational angle sufficiently involves large internal stresses therein, the film has often been peeled off after the preparation of the disk and lacks in the reliability. Furthermore, since the silicon nitride films deposited on the inner surface of the sputtering system peel off owing to the large internal stresses, there is a problem that dusts increase in the sputtering system and result in high defect density of the disk.

SUMMARY OF THE INVENTION

The present invention has been achieved in order to overcome the foregoing problems and it is an object thereof to obtain a magneto-optical disk capable of increasing the Kerr rotational angle and yet having sufficient corrosion resistivity and reliability and also have additional performance of reduced density of defects and high performance since dusts during fabrication processes decrease even upon use of a sputtering method.

The foregoing object of the present invention can be attained by a magneto-optical disk comprising a substrate, a dielectric film comprising aluminum germanium nitride disposed on the substrate and a magnetic film disposed to the dielectric film.

The present invention using a dielectric film comprising aluminum germanium nitride has substantially the same extent of refractive index as that of the conventional products.

BRIEF DESCRIPTION OF THE ACCOMPANYING DRAWINGS

These and other objects, as well as advantageous features of the present invention will become apparent by reading the following descriptions for one embodiment according to the present invention in conjunction with the accompanying drawings, wherein the drawing illustrates a cross sectional view for a magneto-optical disk in one embodiment according to the present invention.

DETAILED DESCRIPTION OF THE PREFERRED EMBODIMENT

The drawing shows a cross sectional view for a magneto-optical disk of one embodiment according to the present invention, comprising a substrate 1, for example, made of glass or plastics, a dielectric film 2 made of aluminum germanium nitride (AlGeN), a magnetic film 3, for example, made of an amorphous TbFeCo alloy film, a bonding adhesive 4 and a bonding substrate 5.

The dielectric film 2 made of aluminum germanium nitride can be formed, for example, by reactive sputtering using a target of aluminum - germanium alloy in a mixed atmosphere of an inert gas and a nitrogen gas, or by reactive sputtering, for example, using two targets, i.e., of an aluminum target and a germanium target in a mixed atmosphere of an inert gas and a nitrogen gas.

The film thickness of AlGeN formed on the substrate is, preferably, selected within a range from 600 Å to 800 Å.

The present invention is to be described specifically by way of examples.

EXAMPLE 1

After evacuating a vacuum vessel to about $10^{-7}$ Torr, a mixed gas of Ar and $N_2$ was introduced to about $2 \times 10^{-3}$ Torr. DC sputtering was applied while using an aluminum alloy target (Ge: 50 at %), to form a dielectric film 2 made of aluminum germanium nitride (AlGeN) of about 650 Å film thickness on the substrate 1 made of polycarbonate. The resultant AlGeN film had physical property with the refractive index of about 2.5 at a wavelength of 830 nm.

The internal stress was $1 \times 10^9$ dyn/cm². The film forming rate was about 50 Å/min at the charging power of 300 W.

Then, the magnetic film 3 made of TbFeCo was formed by means of sputtering to a thickness of about 1,000 Å by a conventional method. Then, the AlGeN film 2 with the film thickness of about 1,000 Å was formed over the previous layers in the same manner.

Finally, a polycarbonate substrate 5 was bonded by using the adhesive 4 to produce a magneto-optical disk as one example of the present invention.

The magneto-optical property of the resultant magneto-optical disk, upon irradiation of light with a wavelength of 830 nm from the side of the substrate, was: reflectance R=15% and Kerr rotational angel $\theta_K$=1.2 deg.

Further, the recording/reproducing characteristics of the magneto-optical disk of one example of the present invention was measured by using an optical head carrying a laser with a wavelength of 830 nm from the side of the substrate. When the recording frequency was 1 MHz and the rotation speed was 1,800 rpm, the carrier-to-noise ratio (hereinafter simply referred to as CNR) was 62 dB and the bit error rate (hereinafter simply referred to as BER) was $1.0 \times 10^{-6}$.

Further, when the magneto-optical disk of one example of the present invention was examined, after maintaining in an atmosphere at a temperature of 60° C. and at a relative humidity of 90% for about 300 hours, no abnormality such as film peeling was not observed.

EXAMPLE 2

A magneto-optical disk of another example of the present invention was prepared in the same manner as in Example 1 except for conducting two-source sputtering while using, as the target, an aluminum target and a germanium target. The recording/reproducing characteristics of the resultant magneto-optical disk were 61.5 db of CNR and $1.2 \times 10^{-6}$ of BER.

When the same examination as that for Example 1 was conducted to the magneto-optical disk in another example of the present invention, similar effects to that in Example 1 could also be obtained.

COMPARATIVE EXAMPLE

A magneto-optical disk was prepared in the same manner as in Example 1 except for using an Al target as the target. The resultant AlN film had a refractive index of 1.9, reflectance R=30%, Kerr rotational angle $\theta_K$=0.6 deg and the recording/reproducing characteristics of: CNR=55 dB.

From the foregoings, it can be seen that the magneto-optical disks of the example of the present invention had increased Kerr rotational angle due to the increased refractive index and higher performance for CNR.

Further, although the explanation has been made in the example for the case where the substrate, AlGeN film, recording magnetic film and AlGeN film were successively laminated, other constitutions may also be employed, for example, comprising the substrate, AlGeN film, recording magnetic film and reflection film, or comprising the substrate, AlGeN film, recording magnetic film, AlGeN film and reflection film, etc., providing that the AlGeN film is disposed so that the Kerr rotation angle is increased.

As has been explained above, since a substrate, a dielectric film comprising aluminum germanium nitride disposed on the substrate and a magnetic film disposed on the dielectric film are used in the present invention, it is possible to obtain a magneto-optical disk with increased Kerr rotation angle while having sufficient corrosion resistivity and reliability. Further, since dusts, etc. during fabrication process are reduced even using the sputtering method for the production, an additional effect capable of obtaining a magneto-optical disk of high performance with low defect density.

What is claimed is:

1. A magneto-optical disk comprising:

a substrate;

a first dielectric film made of aluminum germanium nitride which is capable of increasing the Kerr rotational angle, wherein the value obtained by dividing the product of the refractive index and the film index by the wavelength of a laser beam impinging upon said magneto-optical disk is approximately 0.2 and the thickness of said film is approximately 650 Å;

a magnetic film disposed on said dielectric film;

a second dielectric film having a thickness of approximately 1,000 Å made of the same aluminum germanium nitride composition as said first dielectric film; and an adhesive film disposed on said second dielectric film.

* * * * *